United States Patent [19]

Johnson

[11] Patent Number: 4,934,715
[45] Date of Patent: Jun. 19, 1990

[54] GASKET FOR USE WITH MANHOLE COVERS

[76] Inventor: Roy E. Johnson, 12308 Aegean St., Norwalk, Calif. 90650

[21] Appl. No.: 294,683

[22] Filed: Jan. 9, 1989

[51] Int. Cl.⁵ .......................... F16J 9/00; F16J 9/08
[52] U.S. Cl. ........................... 277/205; 52/20; 220/378; 277/207 R; 285/918; 404/25
[58] Field of Search .................. 277/207 R, 121, 123, 277/205, 235 B, 224, 180; 404/25, 26; 285/911, 910, 918; 52/20, 21; 220/378

[56] References Cited

U.S. PATENT DOCUMENTS

| | | | |
|---|---|---|---|
| 2,929,531 | 3/1960 | Kohlins | 220/378 |
| 3,063,439 | 11/1962 | Kessel | 220/378 X |
| 3,334,774 | 4/1967 | Poltorak | 220/378 |
| 4,192,520 | 3/1980 | Hasegawa | 277/235 B |
| 4,290,616 | 9/1981 | Nicholson | 277/235 B |
| 4,819,953 | 4/1989 | Joh | 277/235 B |
| 4,828,274 | 5/1989 | Stannard | 404/25 X |

FOREIGN PATENT DOCUMENTS 541779  4/1956  Italy ..................... 220/378

Primary Examiner—Allan N. Shoop
Assistant Examiner—Scott W. Cummings
Attorney, Agent, or Firm—Edgar W. Averill, Jr.

[57] ABSTRACT

An improved gasket for use with manhole covers. The gasket is of the type which is fabricated from rubber and is held in a circular groove formed in the flat cover support surface of a cast iron frame of the type which holes a manhole cover. The manhole cover fits in the frame and rests on the gasket. The improved gasket has a vertical portion which is generally rectangular which fits into the circular groove. The gasket also has a horizontal portion which extends beyond the groove and onto the flat cover support surface of the frame.

6 Claims, 1 Drawing Sheet

GASKET FOR USE WITH MANHOLE COVERS

BACKGROUND OF THE INVENTION

The field of the invention relates to utilities and the invention relates more specifically to underground structures used in conjunction with electrical utility structures.

Electrical transmission lines are often carried below ground level in large conduits and in order to service such conduits, openings must be provided below the ground level and such openings, for years, have been covered with heavy metal covers referred to as manhole covers. Manhole covers are supported by cast iron frames held at the ground surface level, and such frames invariably provide for a gasket to reduce the likelihood that water, or more seriously, chemicals, diesel oil and other liquids which could interfere with electrical transmission leak passed the manhole cover into the structure below. Furthermore, the presence of the gasket reduces the rattling noise between the cast iron cover and the machined surface of the frame upon which this cover rests.

In the past, O-rings have been placed in generally rectangular grooves formed in the cast iron frame. Unfortunately, when the manhole cover is removed for use, it is quite common that the O-ring is dislodged when the cover is replaced in the cast iron frame. This happens, in part, because of the propensity of an O-ring to turn and ride out of a groove. Naturally, the manhole cover is very heavy with a typical 30-inch manhole cover weighing approximately 290 pounds. Thus, in practice, it is slid onto the frame, and the edge of the manhole cover can easily touch the gasket and dislodge it. Once dislodged, the seal is ineffective and large amounts of water, or other chemicals, can enter the underground structure.

There is, thus, a need for an improved gasket which will not become dislodged when the manhole cover is replaced onto its cast iron frame.

SUMMARY OF THE INVENTION

It is an object of the present invention to provide a gasket for use in the cast iron frame of a manhole cover, which gasket is less likely to be dislodged when the manhole cover is replaced in the frame.

The present invention is for an improved gasket for use with manhole covers. The gasket is of the type which is fabricated from an elastomer and is held in a circular groove formed in the flat cover support surface of a cast iron frame. The circular groove has a rectangular cross-sectional shape. The improved gasket has a vertical portion which is generally rectangular in shape and which fits into the circular groove. The gasket also has a horizontal portion with a generally flat bottom which rests on the flat cover support surface and extends beyond the groove. Preferably, the horizontal portion is curved so that it is thinner at its outer edge and less likely to be dislodged by the manhole cover. The preferred configuration of gasket has a generally T-shaped cross section wherein the horizontal portion extends from both sides of the vertical portion. Preferably, a groove is formed in the base of the gasket to reduce the tendency of debris from unseating the gasket when it is being placed in a frame which is already in use.

DESCRIPTION OF THE PREFERRED EMBODIMENTS

Figure 1:
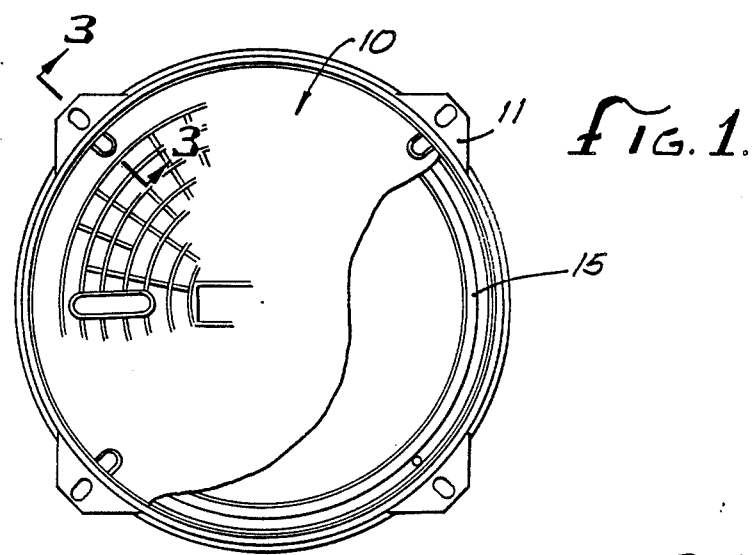
FIG. 1 is a plan view, partially cut away of a frame, manhole cover and the gasket of the present invention.

A manhole cover 10 is shown held in a cast iron frame 11 in FIG. 1. The cast iron frame 11 has a circular groove which contains a gasket 15 shown in FIG. 1. Gasket 15 is held in a circular groove 12 which has a rectangular cross section shown in FIGS. 2 and 3.

Figure 2:
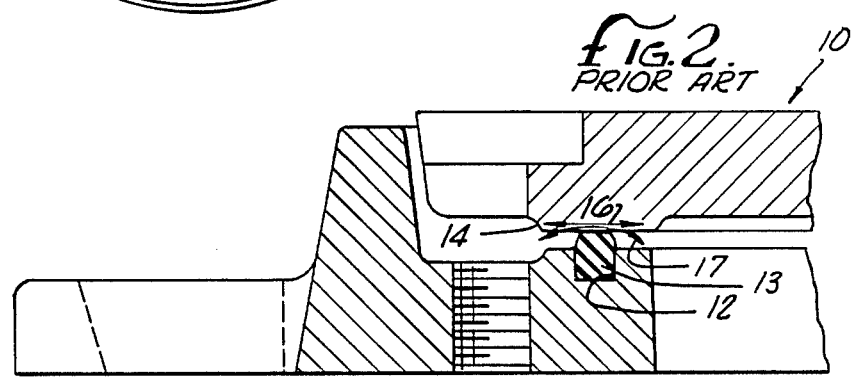
FIG. 2 is an enlarged cross-sectional view showing the frame and cover shown in FIG. 1 but showing a prior art gasket.

A large O-ring has been used in the past as a gasket and such O-ring is identified by reference character 13 in FIG. 2. Manhole cover 10 has a support ring 14 on its underside which extends the entire periphery of cover 10 and rests against the upper surface of the gasket 12 of FIG. 2 or of the gasket 15 of FIG. 3. As the manhole cover is being replaced into cast iron frame 11, the support ring 14 moves generally horizontally as indicated by arrow 16. This tends to roll O-ring 13 out of groove 12 generally in the direction of arrow 17. This results in dislodging the O-ring 13 of groove 12 and destroying the seal function which the gasket is intended to fulfill.

Figure 3:
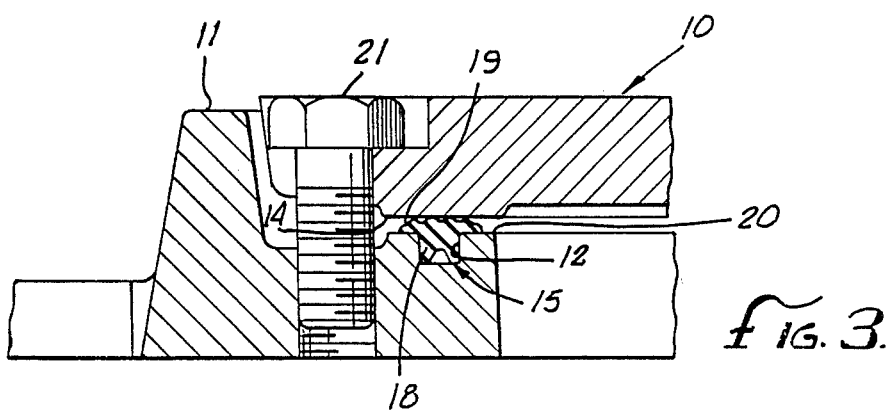
FIG. 3 is an enlarged cross-sectional view taken along line 3—3 of FIG. 1.

The improved gasket is shown held in circular groove 12 in FIG. 3 where it can be seen that gasket 15 has a generally vertical portion 18 which fits in groove 12 and a generally horizontal portion 19 which extends onto the flat cover support surface 20 of cast iron frame 11. Typically, four bolts, such as bolt 21, are used to secure manhole cover 10 onto cast iron frame 11 so that it will not be dislodged in the event of an explosion.

Because of the horizontal portion of gasket 15, it does not tend to be rolled out of groove 12 when cover 10 is placed in frame 11. This security is further enhanced by the generally curved top 22 which causes the outer edges 23 and 24 to be thinner than the thickness of the horizontal portion adjacent the vertical portion 18 of gasket 15. As any portion of the support ring abuts the generally horizontal portion 19, it tends to hold gasket 15 in groove 12. It can be seen that the generally horizontal portion 19 has a pair of generally flat bottoms 25 and 26 which abut the flat cover support surface 20.

Preferably, a plurality of grooves such as grooves 26, 27 and 28 are formed in the curved top 22 of gasket 15 to further assist in sealing the manhole cover 10 to the cast iron frame 11.

The gasket is fabricated from an elastomer such as EPDM, a polymer made from ethylene propylene diene monomer, which has excellent weather resistance having a shore D durometer of about 60. It was found that a gasket having a shore durometer of about 40 did not have sufficient hardness and was more easily dislodged than the same gasket fabricated with a hardness of 60 shore D.

The gasket can either be molded or extruded. In the event it is extruded, it should be extruded with a curved shape and may either be cut and glued in the field or cut and glued at a remote location.

The gasket of the present invention has greatly improved the seal between the manhole cover and the cast iron frame. An inverted, generally V-shaped groove 29 is preferably formed at the base of the vertical portion 18. This groove is capable of holding any dirt that may have remained in groove 12 as, for instance, when an old O-ring is removed and replaced with the improved gasket of the present invention. If the base of the vertical portion 18 were entirely flat, any significant amount of dirt would cause the gasket to not properly seat in the groove which might reduce its ability to stay in the groove.

Figure 4:
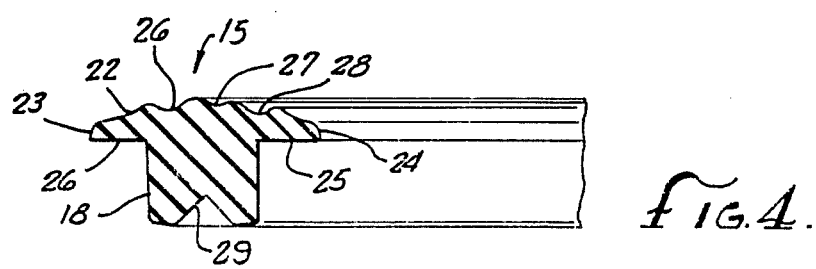
FIG. 4 is an enlarged cross-sectional view of the improved gasket of the present invention.

While the horizontal portion might extend only in one direction away from the vertical portion, it preferably extends in both directions as shown in FIG. 4. While three grooves are shown in the upper surface, of course a larger or smaller number of grooves might be used, but the use of grooves tends to reduce the deleterious effect of dirt or other irregularities on the underside of the manhole cover.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. An improved gasket for use with manhole covers, said gasket being of the type which is fabricated from an elastomer and is held in a circular groove formed in a flat cover support surface of a cast iron frame, said circular groove having a rectangular cross section wherein the improvement comprises:

a gasket having a vertical portion which is generally rectangular in shape, which vertical portion fits into the circular groove and said gasket further having a horizontal portion having a generally flat bottom which extends beyond the groove and onto the flat cover support surface of the frame and wherein the horizontal portion is curved so that it is thinner at its outer edge than it is at its point of connection with the vertical portion.

2. The improved gasket of claim 1 wherein the horizontal portion extends away from the vertical portion on both sides of the vertical portion.

3. The improved gasket of claim 2 wherein the horizontal portion has a curved upper surface whereby the outer edges of the horizontal portion are thinner than the inner portions of the horizontal portion.

4. An improved gasket for use with manhole covers, said gasket being of the type which is fabricated from an elastomer and is held in a circular groove formed in a flat cover support surface of a cast iron frame, said groove having a rectangular cross section wherein the improvement comprises:

a gasket having a generally "T" shaped cross section with the vertical portion of the "T" being generally rectangular in shape which fits into the circular groove, and the horizontal portion of the "T" shaped cross section having a generally flat bottom which extends beyond the groove and onto the flat cover support surface of the frame, and the horizontal portion of the "T" shaped cross section having a curved top which is tapered at the outer edges thereof.

5. The improved gasket of claim 4 further including a generally inverted "V" shaped groove formed in the bottom of the vertical portion of the gasket.

6. The improved gasket of claim 4 further including a plurality of grooves formed in the upper surface on the horizontal portion of the gasket.

* * * * *